(12) United States Patent
Olrog

(10) Patent No.: US 8,495,225 B2
(45) Date of Patent: Jul. 23, 2013

(54) METHODS AND ARRANGEMENTS FOR A TELECOMMUNICATIONS SYSTEM

(75) Inventor: Christian Olrog, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 213 days.

(21) Appl. No.: 12/678,693

(22) PCT Filed: Sep. 20, 2007

(86) PCT No.: PCT/EP2007/059929
§ 371 (c)(1),
(2), (4) Date: Mar. 17, 2010

(87) PCT Pub. No.: WO2009/036801
PCT Pub. Date: Mar. 26, 2009

(65) Prior Publication Data
US 2010/0205311 A1    Aug. 12, 2010

(51) Int. Cl.
*G06F 15/16* (2006.01)
*G06F 12/00* (2006.01)

(52) U.S. Cl.
USPC .......................................... 709/228; 709/227

(58) Field of Classification Search
USPC .......................................... 709/227–228, 230
See application file for complete search history.

(56) References Cited

U.S. PATENT DOCUMENTS

| | | | |
|---|---|---|---|
| 7,251,317 B1 * | 7/2007 | Robbins et al. | 379/114.21 |
| 7,583,662 B1 * | 9/2009 | Ho et al. | 370/356 |
| 7,698,435 B1 * | 4/2010 | Paterik et al. | 709/227 |
| 2005/0180394 A1 * | 8/2005 | Kautz et al. | 370/352 |
| 2008/0316998 A1 * | 12/2008 | Procopio et al. | 370/352 |
| 2009/0083426 A1 * | 3/2009 | Cagenius | 709/227 |
| 2009/0313376 A1 * | 12/2009 | Cedervall et al. | 709/227 |
| 2010/0070636 A1 * | 3/2010 | Skog et al. | 709/228 |

FOREIGN PATENT DOCUMENTS

| | | |
|---|---|---|
| WO | 2005/025196 A1 | 3/2005 |
| WO | 2005/039132 A1 | 4/2005 |

OTHER PUBLICATIONS

EPO, Int'l Search Report in PCT/EP2007/059929, Jun. 25, 2008.
EPO, Written Opinion in PCT/EP2007/059929, Jun. 25, 2008.
IETF, RFC 2848, The PINT Service Protocol: Extensions to SIP and SDP for IP Access to Telephone Call Services, Jun. 14, 2000.
3GPP, Technical Specification 24.279 V7.5.0, Combining Circuit Switched (CS) and IP Multimedia Subsystem (IMS) Services, Stage 3 (Release 7), Jun. 2007.
IETF, RFC4145, TCP-Based Media Transport in the Session Description Protocol (SDP), Sep. 15, 2005.

* cited by examiner

*Primary Examiner* — Zarni Maung
(74) *Attorney, Agent, or Firm* — Potomac Patent Group PLLC

(57) ABSTRACT

The present invention relates to a solution for including CS media information to be able to also offer CS media in addition to PS media by using SIP and hence being able to utilize the advantages of SIP for CS. The solution is achieved by a method and arrangements for handling at least a first c line (140) in a SDP (170) and for inserting a CS address (150) into the first c line and means for indicating in said first c line that the address is associated with a CS connection (160).

22 Claims, 4 Drawing Sheets

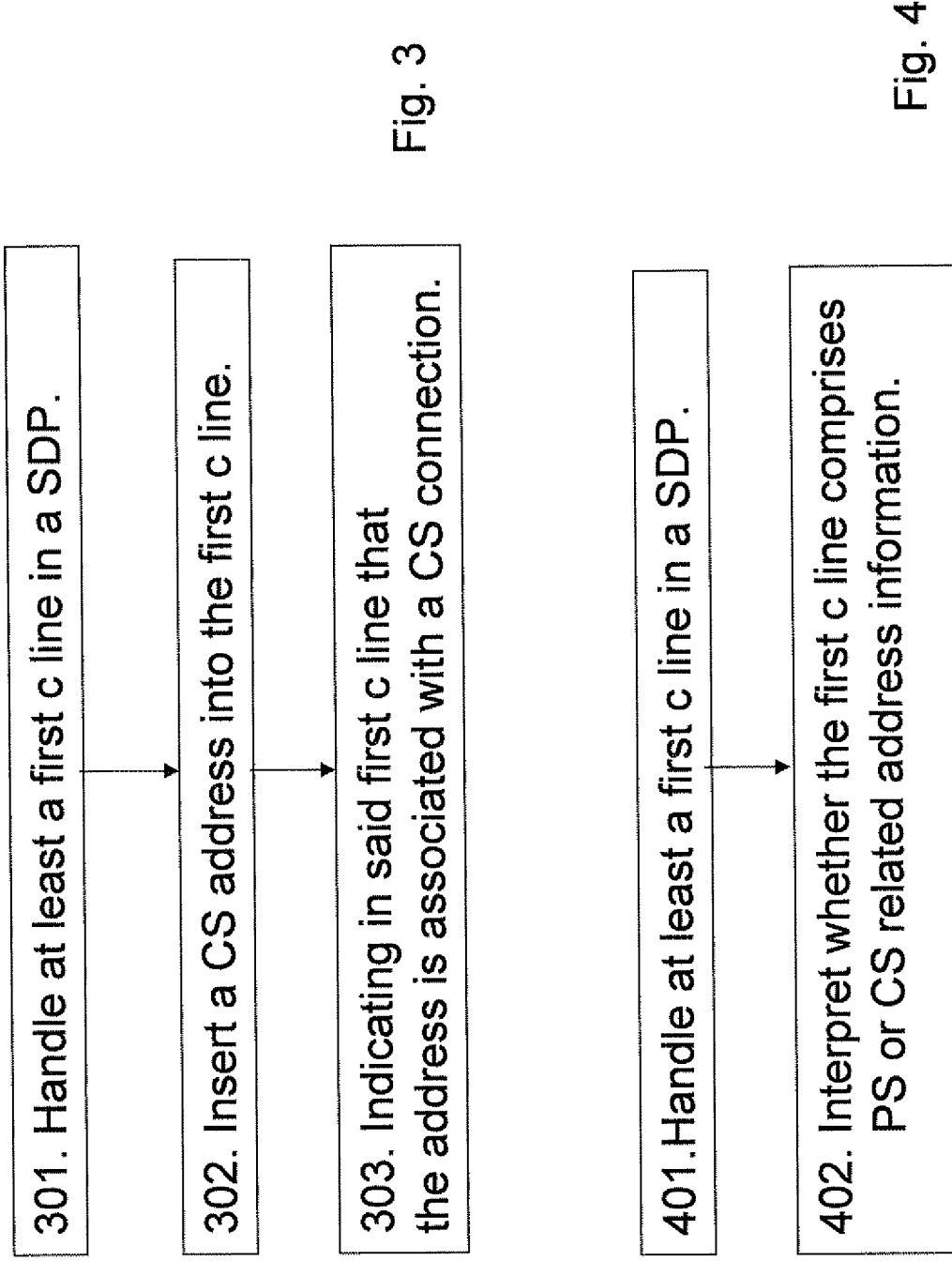

METHODS AND ARRANGEMENTS FOR A TELECOMMUNICATIONS SYSTEM

TECHNICAL FIELD

The present invention relates to methods and arrangements for a telecommunications system supporting the Session Initiation Protocol (SIP), and in particular to a method and arrangements for sending circuit switched media information by using the mechanisms of the SIP and the Session Description Protocol (SDP).

BACKGROUND

The Session Initiation Protocol (SIP) is an application-layer control (signaling) protocol for creating, modifying, and terminating sessions with one or more participants. It can be used to create two-party, multiparty, or multicast sessions that includes Internet telephone calls, multimedia distribution, and multimedia conferences. I.e. SIP is a protocol for describing with whom to communicate with. Moreover, SIP is designed to be independent of the underlying transport layer; it can run on e.g. TCP.

The Session Description Protocol (SDP) is a format for describing streaming media initialization parameters, which is further described in RFC 4566. The SDP is intended for describing multimedia session for the purpose of session announcement, session invitation, and other forms of multimedia session initation. SDP can be used in conjunction with e.g. SIP or in a standalone format for describing multicast sessions. The SIP SDP offer answer model is a way of negotiating the media type to be used. Each user includes an SDP field during a setup and the SDP comprises the codec/media type that the user can use, the user's IP address and port number. The IP address and the port number is included in a "connection" ("c") line. More than one "c" lines may be included in the SDP if the user can communicate via multiple networks such as e.g. both WLAN (Wireless Local Area Network) and 3G.

A user "A" who wants to initiate a session with a user "B" sends a SIP invite to user B. The session can be established when the user B has accepted the invite. The session may include exchange of media or just SDP signalling. The SDP signalling is transmitted according to the SIP and the SDP signalling describes the characteristics of the media to be transmitted. Both parties can update the SDP by sending an update or re-invite with the new SDP.

By using the SDP, packet switched media information can be included in the SIP signaling but SIP and SDP do not provide any possibilities to include circuit switched (CS) media information. It is however desired to include CS media information to be able to also offer CS media in addition to PS media by using SIP and hence being able to utilize the advantages of SIP for CS. By offering both PS media and CS media in an SDP offer, interoperability can be achieved by allowing the receiving party's terminal to choose the best suited media (CS or PS) that it understands. A terminal that does not understand CS should e.g. be able to choose PS.

Some application allows a combination of PS communication and CS communication by setting up a CS call to be used for voice and additionally a PS connection to be used for e.g. exchanging data such as a map or for sharing a whiteboard.

SUMMARY

It is however desired to include CS media information to be able to also offer CS media in addition to PS media by using SIP and hence being able to utilize the advantages of SIP for CS. By offering both PS media and CS media in an SDP offer, interoperability can be achieved by allowing the receiving party's terminal to choose the best suited media (CS or PS) that it understands. A terminal that does not understand CS should e.g. be able to choose PS.

This is according to the present invention achieved by inserting a CS related address in a connection line of the SDP.

Thus, the present invention relates to a method and arrangements for handling at least a first c line in a SDP and for inserting a CS address into the first c line and means for indicating in said first c line that the address is associated with a CS connection.

In accordance with a further aspect the present invention relates to a method to be implemented in an entity and an entity configured to receive media via SIP and configured to understand SDP for obtaining information of the media received by means of the SIP. The entity comprises means for handling at least a first c line in a SDP and means for interpreting whether the first c line comprises PS related address information or CS related address information.

In accordance with a yet further aspect the present invention relates to a method to be implemented in an application server and an application server in a telecommunication network associated with a first or a second terminal, wherein the first terminal is adapted to exchange media with a second terminal via SIP. The AS comprises means for inspecting SIP SDPs from the first terminal and means for interpreting whether a c line comprises PS related address information or CS related address information.

An advantage with the present invention is that it provides a straightforward integration of CS and PS SIP signaling which allows reusing old components such as existing gateways whilst utilizing the power of the newer SIP signaling when available.

A further advantage is that by offering both PS (e.g. Real Time Protocol (RTP)) and CS media in an SDP offer interoperability can be achieved by allowing the receiving party's terminal to choose the best suited media that it understands, e.g. PS or CS.

A further advantage is that it is simple to device an Application Server (AS) to translate between SDP-CS and SDP-PS on-the-fly by allocating a media gateway PS resource. Again the possibility to use private numbering schemes (the number sent from the AS to the client can be any number that allows the AS to map the CS to the PS stream) allows for simple allocation of media resources. In this case the receiving user's number will be replaced by a gateway number performed by an intermediate server providing CS to the terminal. A PS resource will be allocated in a gateway and the gateway offers this resource to the receiving user who only understands PS.

A further advantage is that no server components are necessary for basic flows. Thus it is possible to signal SIP-SIP between two terminals and transfer CS media between these two terminals directly. Their phone numbers are signaled in SDP. Other prior art solutions require stateful server anchoring.

A further advantage is that the present invention makes it possible to directly interpret CS SDP and set up a CS call leg without server intervention. (Whilst still maintaining SIP signaling and allowing for application integration—e.g. weshare and instant messaging over IP.)

To set up a CS call takes approximately 5-10 seconds, which implies that it takes more time to change from PS to CS than from CS to PS. Therefore, when changing from a PS call to a CS call, the CS call should be initiated before the termination of the PS call. SIP Re-Invite is a standard way of indicating that a user wants to start negotiating about the SDP during an on-going call (e.g. improving the sound quality or adding video). Thus, a further advantage is that it is possible to re-Invite with new SDP (CS or IP based depending on direction). As stated above, the CS leg setup time must be taken into account before switching between the PS and the CS media streams.

An advantage with one embodiment of the present invention is that an invite from a server can specify the CS number (including locally present) by specifying setup direction (active/passive) and optionally priority either end can have a say in which direction the call should be initiated e.g. local country dial in to a gateway. This feature is referred to as least cost routing.

BRIEF DESCRIPTION OF THE DRAWINGS

FIG. 3 illustrates a method for an entity configured to transmit media via SIP and to use SDP for describing the media transmitted;

FIG. 4 illustrates a method in an entity configured to receive media via SIP and to understand received SDP information.

DETAILED DESCRIPTION

Figure 1:
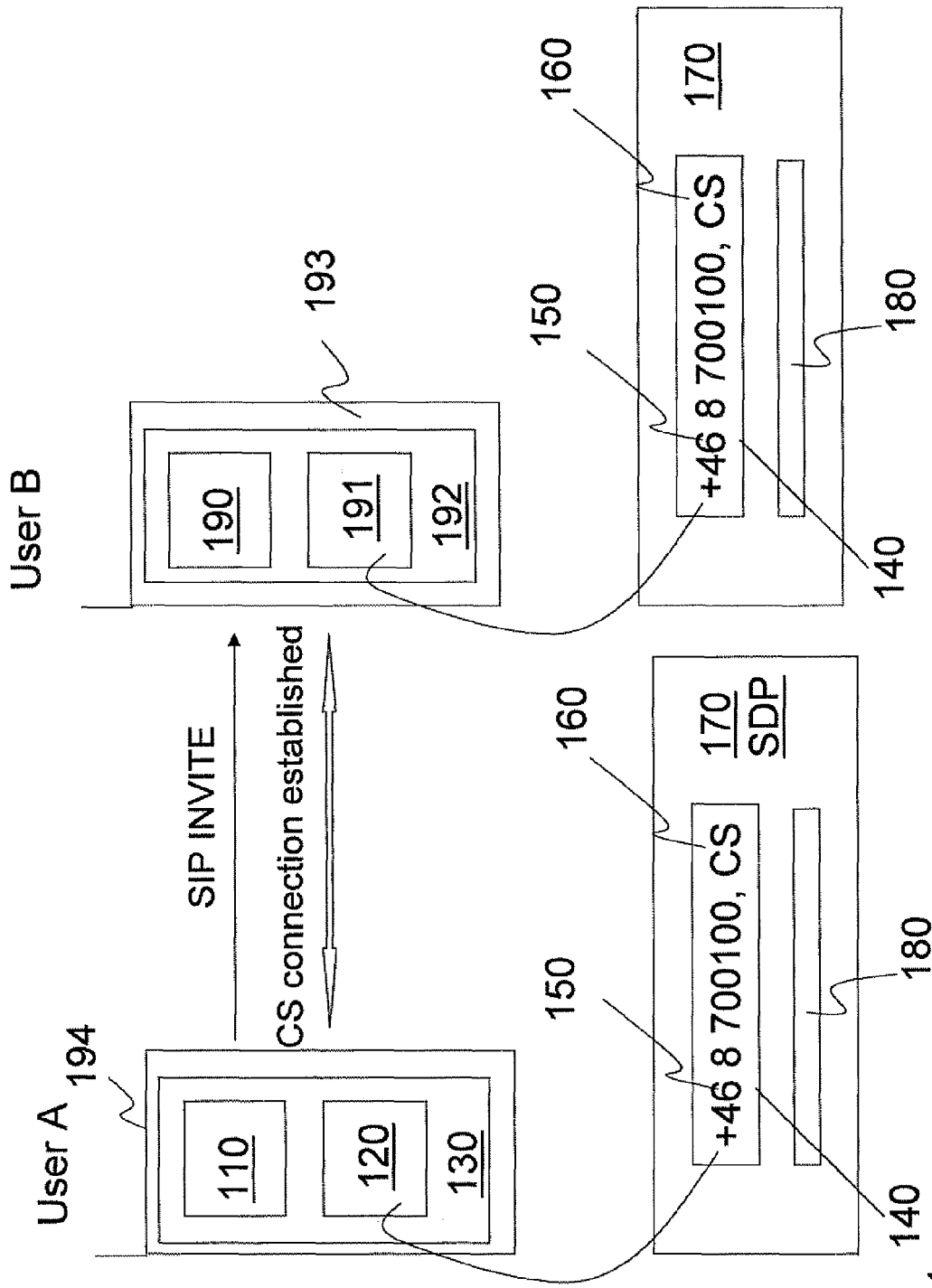
FIG. 1 illustrates a scenario in which two users communicate via SIP and are capable of using the invention.

It should be noted that the terms user and terminal are used in this specification interchangeably to simplify the description. E.g. even if it is said that the user sends a message, it means that the terminal of said user sends the message.

The basic idea of the present invention is to use the existing connection lines (c lines) in the Session Description Protocol (SDP) to signal a CS related address such as a telephone number. In addition to the CS related address an indication is added in the c line such that it is possible to identify whether the inserted address is related to CS or PS.

By configuring an entity of a transmitting terminal to insert the CS related address in the c line and to indicate that the inserted address is a CS address and by configuring the entity of a receiving terminal or an application server (AS) in the network to interpret the address inserted into the c line as a CS address it is possible to negotiate between PS based media and CS based media. In this way, an initiating terminal can offer to set up both a PS connection and a CS connection and the network or the receiving terminal can determine whether CS or PS should be used.

The CS related address may be a local phone number e.g. c=GSM+46708761199 or c=GSM+46856867200, c=GSM 67200 (where the latter is short number form). The local number is what the connecting party will use as target number when setting up a connection (and if number information is properly conveyed it can be used for the receiving party to correlate calls).

The indication whether the address inserted into the c line is a CS related or PS related address may be the notation "GSM" or "CS" for circuit switched or "PS" for packet switched.

Further, in order to indicate whether the use of CS information in SDP is supported to other terminals or application servers a SIP OPTIONS message may be used. A trial and error method may also be applied.

E.g. a user tries to send a message with the c line comprising GSM+46856867200 and then waits and finds out whether the receiver understands this format or if an error message is received.

The SIP OPTIONS message is sent from a SIP device to another device to check which extensions are supported—the other party replies with a list of "Supported: [extension]" where [extension] could indicate support of the present invention. Thus the SIP OPTIONS message can be used to detect if the other party supports the feature of the present invention. Hence if the present invention is supported the concept of negotiation of circuit switched based media as it would be packet switched based media such as VoIP (Voice over IP), the management of least cost routing and dual mode/voice call continuity which is achieved by the use of the multiple c lines, e.g. one c line for CS and one for PS is supported.

Further, an embodiment of the present invention offers the possibility to select the direction of a call. I.e. a server in the network of the enterprise without knowledge of the operator when the terminal has a SIP channel towards the enterprise, or in the operator network as an operator provided service can select the direction the call will be set up based on rates by using existing mechanisms of SIP and SDP. The direction is according to one embodiment selected by using the existing SDP attribute a=setup:[active|passive|actpass|holdconn] to signal which side should initiate the CS connection. This attribute is further described in RFC 4145 and is currently used for packet switched TCP connections. This attribute may be inserted in the SDP. By being able to utilize the mechanisms of SIP also for CS connections in accordance with the present invention, it is possible to also use this attribute for selecting the direction of a call for CS. Selecting the direction for call setup means that it is possible to choose whether the initiating user himself should set up the call or if a gateway should call the mobile terminal instead which results in an incoming call to the "initiating mobile terminal", although the originally initiating user experiences that the he has initiated the call. In some cases, it is less expensive to receive calls than to initiate calls, and also the other way around may occur.

Below is a description of each field of the attribute setup which comprises one of the fields active, passive, actpass and holdconn:

'active': The endpoint will initiate an outgoing connection.

'passive': The endpoint will accept an incoming connection.

'actpass': The endpoint is willing to accept an incoming connection or to initiate an outgoing connection.

'holdconn': The endpoint does not want the connection to be established for the time being.

By using the attributes of an Offer that sets the conditions and the attributes of an answer that responds to the offer, the CS initiating side may be determined.

E.g. the combination Offer: a=setup:actpass, Answer: a=setup:passive implies that the receiver of a SIP invite (B-part) does not set up the connection but instead wait for the transmitter of the SIP invite (the A-part) to initiate the CS call.

Therefore, by including both CS and PS in the SDP, a negotiation between CS and PS can be performed and the direction of the call may be selected based on the current rates both for CS and for PS. By using a=setup:active or a=setup:passive, the direction of the call may be determined.

A further "a" attribute line specifying "a=networkcode: mcc+mnc" can optionally be used to signal "Mobile Country Code" and "Mobile Network Code" to assist in choosing a proper local dial in and the direction for call setup. The attribute "a=networkcode:mcc+mnc" has to be combined with a=setup:active/passive to assist in choosing the direction for call set up. The network code is used to let the AS and/or the receiver know where the terminal is located in terms of operator and country to be able to determine costs and thereby optimize the call settings c=GSM+46708761199
    a=networkcode:046+013
    a=setup:actpas The "a" is inserted in the SDP as described above. Local dial in can be exemplified by the following scenario: When calling to a receiver in another country, a local server/gateway may be used such that the caller dials the number to the local server/gateway, which switches the call to the other country.

The attribute a=connection:[new|existing] can according to one embodiment be used to recover information about a CS session established without IP-link—e.g. in the case of loss of IP PS bearer for signaling. "New" implies that a new connection should be set up (this may be set as default); existing implies that the connection already exists and a sip signaling should be established. Existing is e.g. used for a mobile phone that has been outside GPRS/3G coverage and has initiated or received a GSM call in a conventional manner. When the IP (GPRS/3G) coverage returns, it is desired to receive the name of the B-part and to add SIP services such as WeShare and Instant messaging to the call.

Turning now to FIG. 1 illustrating the following scenario when two users, user A and user B communicates via SIP and where both users A and B (i.e. the terminals of user A and user B) are capable of using the present invention. Both user A and user B are capable of both PS and CS, but at the moment in time when the user A initiates the session with user B, only GSM coverage (i.e. CS) is available for user A. In this scenario a user A sends a SIP INVITE to a set up a call with CS based media, such as a voice call with a user B. The terminal 194 of user A comprises an entity 130. The entity 130 comprises means for handling 105 a c line 140 in a SDP 170 and means for inserting 110 a phone number 150 of user A in a c line 140 of the SDP 170 in accordance with the present invention. Further, the entity 130 comprises means for indicating 120 in said c line 140 that the phone number 150 is associated with a CS connection 160. Attributes 180 may also be inserted in the SDP as described above.

The user B receives the SIP INVITE message comprising the SDP 170 with the CS phone number 150 inserted into the c line 140. The terminal 193 of user B comprises according to one aspect of the invention an entity 192 comprising means for handling 190 a c line 140 in a SDP 170 and means for interpreting 191 whether the c line 140 comprises PS related address information or CS related address information.

Since the user B is also capable of CS, a circuit switched call is set up with a SIP session, which is indicated by the arrow.

During the call, the user A may move to an area having WLAN (Wireless LAN) coverage or HSPA (High Speed Packet Access) coverage. The user A may then create a new SDP indicating PS media (by inserting an IP address and a port number into the c line) to the network or a new SDP indicating both CS and PS media (by having a first c line where a CS related address and the CS indication are inserted and a second c line where an IP address and a port number are inserted) and letting the network or the receiver select PS or CS. Since both users A and B are able to communicate via a packet switched connection, PS based media (e.g. voice) is selected. The respective terminal of the users A and B establishes a PS connection such that the media can be transmitted on that connection instead of the CS connection by updating the SDP by a re-INVITE message or an UPDATE message. When the PS connection is established, the terminals switches to the PS connection and terminates the CS connection in a seamless fashion.

In accordance with a further alternative, the network may also be given the possibility to delete some parts of the SDP created by the user A. It should be noted that the call between the user A and B may also continue by using the CS connection.

Figure 2:
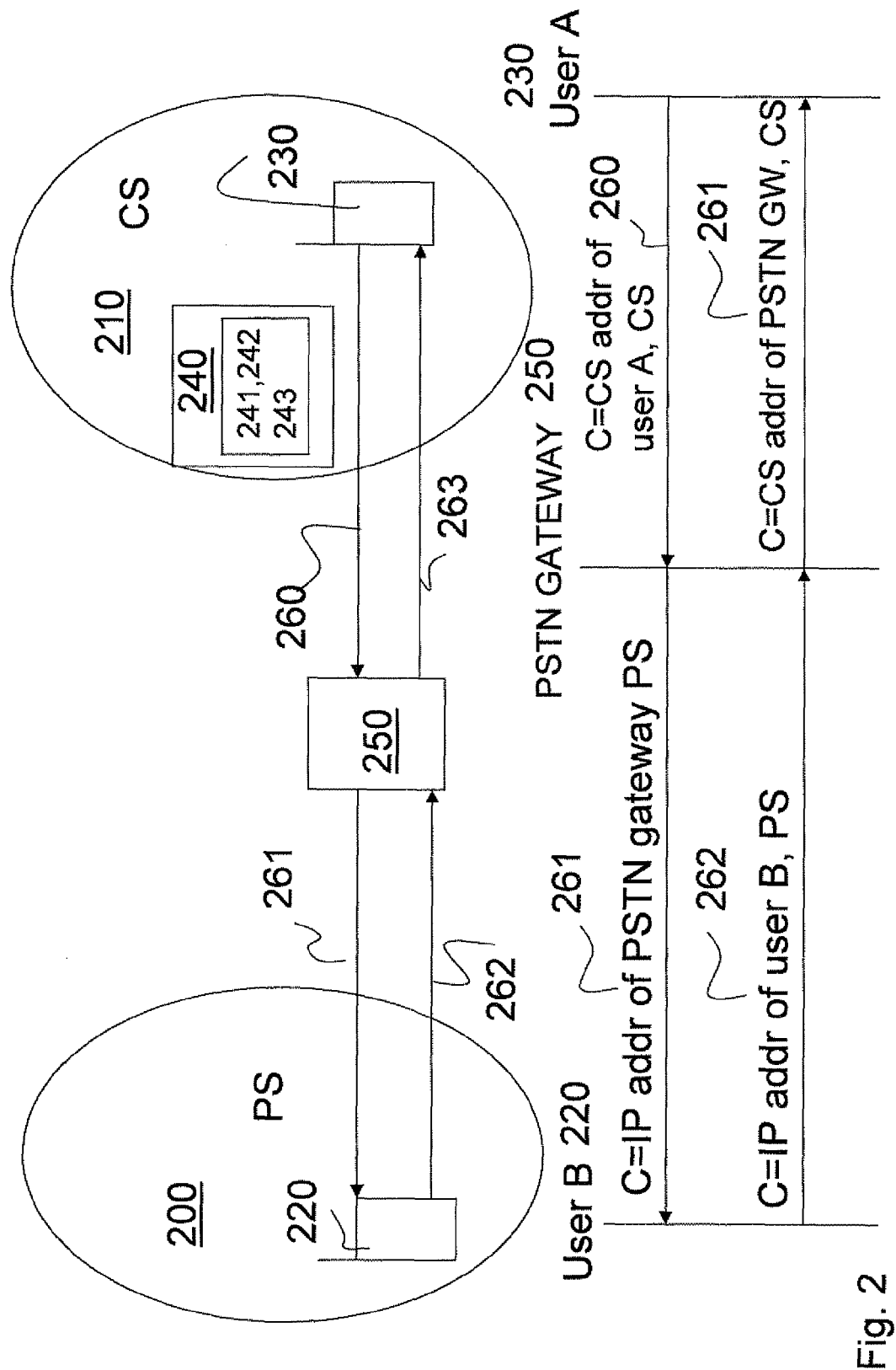
FIG. 2 illustrates a scenario in which one user capable of using the invention and one user is not.

Turning now to FIG. 2, exemplifying another aspect of the invention where user A 230 is capable of using the present invention whereas user B 220 is not capable of using the present invention. User A 230 is connected to a CS network 210 and user B is connected to a PS network 200. In this case, an Application Server 240 associated with user A (it should be noted that it may also be the AS of the user B) has to be involved in order to handle a c line comprising a CS related address. The user A 230, will not communicate directly with user B 220, instead it will communicate via a PSTN gateway 250 which forwards messages from the user A 230 to user B 220 in such a way that the user B 220 does not have to understand the CS related address of user A 230. In this example, the user A 230 can communicate via a CS connection while user B 220 can only communicate via a PS connection. The user A 230 sends a SIP INVITE 260 to user B 220 with an SDP comprising a c line with the phone number of user A and an indication that the phone number is a CS related address. The flowchart of FIG. 2 illustrates a part of the content of the c line. The AS 240 associated with the user A 230 comprises means for inspecting 241 the SIP INVITE message and means for interpreting 242 that it comprises a CS address. The AS 240 detects that the message is intended for a user (i.e. user B) that does not understand that the address of the c line is a CS address. Therefore, the AS 240 comprises according to an embodiment means for manipulating 243 the SIP INVITE message by deleting the CS phone number and inserting an IP address and a port number of a PSTN gateway. The port number and the IP address is inserted in the SDP in accordance with prior art in the message 261. The user B and the PSTN gateway can now set up a PS connection and all communication between user A and user B will be sent via the PSTN gateway. I.e., when user B sends a message 262 to user A, the c line comprises the IP address and the port number of user B. The c line of the SDP of the message 263 that is forwarded from the PSTN gateway to user A comprises the CS address of the PSTN gateway and an indication that it is a CS address.

Further, when a legacy telephone not capable of using SIP communicates with a terminal that is capable of using the present invention an AS have to be involved. The communicated messages between the legacy terminal and the terminal capable of using the present invention have to pass through the AS. The AS is configured to receive calls from the legacy terminal and the AS is configured to modify the messages from the legacy terminal in a way that makes the terminal supporting the invention to believe that the legacy terminal also supports the invention. I.e. the AS inserts the phone number of the legacy terminal into a c line and the AS is able to use the SIP and SDP mechanisms described above.

In order to achieve a secure solution, a remote CS end terminal may be asked to verify himself with DTMF (dual tone multi frequency) signalling. This is required if the caller line identity (CLI) by some reason is out of function.

The attribute a=dtmfauth:NNNN may be used for this purpose. NNNN is a code to be used for checking the identity of the calling terminal.

This attribute may be signalled immediately or when the receiver has answered the call by a re-invite or an update when no CLI is received or when the CLI seems to be erroneous.

The use of the verification by means of the DTMF signalling is illustrated by the following example.

1) User A calls user B via a gateway and circuit switched information is used in SDP throughout the network in accordance with the present invention.

2) User A sends an INVITE to B that is intercepted by an AS. The AS instructs user A and the user B to call the gateway.

3) If the CLI would be omitted when the User A calls the gateway, the gateway sends a re-INVITE with an SDP comprising CS information in the same manner as when the user A did set up the call towards the gateway but the re-INVITE comprises a:dtmfauth=4569 and a:connection=existing.

4) In order to make the gateway aware of whether it is the correct terminal (i.e. user A) it sends a re-INVITE with an SDP comprising the CS information in the same manner as when the user A set up the call towards the gateway but the re-INVITE comprises a:dtmfauth=4569 and a:connection=existing.

5) The user A receives a new SDP re-invite and signals DTMF.

6) The user B sets up a call towards the gateway, but in this example the CLI is included and no additional verification is necessary.

Further, the present invention relates to methods.

In accordance with one aspect as illustrated in FIG. 3 the method is adapted for an entity configured to transmit media via SIP and configured to use SDP for describing the media transmitted by means of the SIP. The method comprises the steps of:

301. Handle at least a first c line in a SDP.
302. Insert a CS address into the first c line.
303. Indicating in said first c line that the address is associated with a CS connection.

In accordance with a further aspect as illustrated in FIG. 4 the method is adapted to be implemented in an entity configured to receive media via SIP and configured to understand SDP for obtaining information of the media received by means of the SIP. The method comprises the steps of:

401. Handle at least a first c line in a SDP.
402. Interpret whether the first c line comprises PS related address information or CS related address information.

Figure 5:
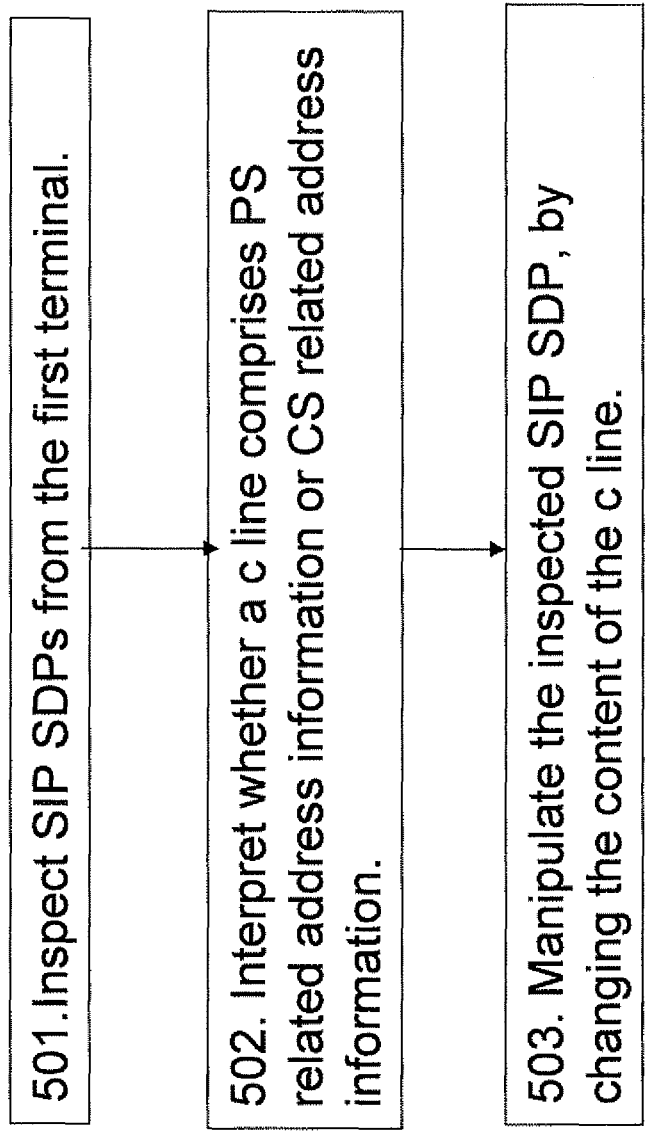
FIG. 5 illustrates a method in an application server.

In accordance with a yet further aspect of an embodiment as illustrated in FIG. 5, the method is adapted to be implemented in an application server in a telecommunication network. The method comprises the steps of:

501. Inspect SIP SDPs from the first terminal.
502. Interpret whether a c line comprises PS related address information or CS related address information.
503. Manipulate the inspected SIP SDP, by changing the content of the c line.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. An entity configured to transmit media via a Session Initiation Protocol (SIP) and to use a Session Description Protocol (SDP) for describing the media transmitted via the SIP, comprising a device configured to handle at least a first c line in a SDP message, a device configured to insert a circuit-switched (CS) address into the first c line, a device configured to indicate in the first c line that the CS address is associated with a CS connection, a device configured to handle at least a second c line, and a device configured to insert packet-switched (PS) related address information into the second c line, wherein the media transmitted via the SIP is described using the SDP message.

2. The entity of claim 1, wherein an indication that the address is a CS address comprises a further parameter in addition to the CS address.

3. The entity of claim 1, wherein the CS address is a phone number.

4. The entity of claim 1, further comprising a device configured to insert a first attribute line in the SDP message to select a direction for a call to be established between a first terminal and a further terminal, wherein the first attribute line corresponds to:

a=setup:[active|passive|actpass|holdconn].

5. The entity of claim 4, further comprising a device configured to insert a second attribute line specifying to signal a Mobile Country Code and a Mobile Network Code to assist in choosing a proper local dial in and direction for call setup, wherein the second attribute line corresponds to:

a=networkcode:mcc+mnc.

6. The entity of claim 1, further comprising a device configured to insert a third attribute line to recover information about a CS session established without an Internet Protocol (IP) link, wherein the third attribute line corresponds to:

a=connection:[new existing].

7. An entity configured to receive media via a Session Initiation Protocol (SIP) and to understand a Session Description Protocol (SDP) for obtaining information of the media received via the SIP, comprising a device configured to handle at least a first c line in a SDP message, a device configured to interpret whether the first c line comprises packet-switched (PS) related address information or circuit-switched (CS) related address information, wherein the media transmitted via the SIP is described using the SDP message, a device configured to handle at least a second c line, and a device configured to interpret whether the second c line comprises PS related address information or CS related address information.

8. The entity of claim 7, wherein the entity is implemented in a terminal.

9. The entity of claim 7, wherein the entity is implemented in an application server.

10. An application server (AS) for a telecommunication network associated with a first terminal or a second terminal, wherein the first terminal is adapted to exchange media with the second terminal via a Session Initiation Protocol (SIP), the AS comprising a device configured to inspect SIP Session Description Protocol (SDP) messages from the first terminal, and a device configured to interpret whether a first c line comprises packet-switched (PS) related address information or circuit-switched (CS) related address information, wherein the media exchanged via the SIP is described using an inspected SIP SDP message, and to interpret whether a second c line comprises PS related address information or CS related address information.

11. The AS of claim 10, further comprising a device configured to manipulate an inspected SIP SDP message by changing content of the first c line.

12. A method in an entity configured to transmit media via a Session Initiation Protocol (SIP) and configured to use a Session Description Protocol (SDP) for describing the media transmitted via the SIP, the method comprising handling at least a first c line in a SDP message, inserting a circuit-switched (CS) address into the first c line, indicating in the first c line that the address is associated with a CS connection, wherein the media transmitted via the SIP is described using the SDP message, handling at least a second c line, and inserting packet-switched (PS) related address information into the second c line.

13. The method of claim 12, wherein an indication that the address is a CS address comprises a further parameter in addition to the CS address.

14. The method of claim 12, wherein the CS address is a phone number.

15. The method of claim 12, further comprising inserting a first attribute line in the SDP message to select a direction for a call to be established between a first terminal and a further terminal, wherein the first attribute line corresponds to:

a=setup:[active|passive|actpass|holdconn].

16. The method of claim 15, further comprising inserting a second attribute line specifying to signal a Mobile Country Code and a Mobile Network Code to assist in choosing a proper local dial in and direction for call setup, wherein the second attribute line corresponds to:

a=networkcode:mcc+mnc.

17. The method of claim 12, further comprising inserting a third attribute line to recover information about a CS session established without an Internet Protocol (IP) link, wherein the third attribute line corresponds to:

a=connection:[new existing].

18. A method in an entity configured to receive media via a Session Initiation Protocol (SIP) and to understand a Session Description Protocol (SDP) for obtaining information of the media received via the SIP, the method comprising handling at least a first c line in a SDP message, interpreting whether the first c line comprises packet-switched (PS) related address information or circuit-switched (CS) related address information, wherein the media transmitted via the SIP is described using the SDP message, handling at least a second c line, and interpreting whether the second c line comprises PS related address information or CS related address information.

19. The method of claim 18, wherein the method is implemented in a terminal.

20. The method of claim 18, wherein the method is implemented in an application server.

21. A method in an application server (AS) for a telecommunication network associated with a first terminal or a second terminal, wherein the first terminal is adapted to exchange media with a second terminal via a Session Initiation Protocol (SIP), the method comprising inspecting a SIP Session Description Protocol (SDP) message from the first terminal, and interpreting whether a first c line comprises packet-switched (PS) related address information or circuit-switched (CS) related address information, wherein media exchanged via the SIP is described using an inspected SIP SDP message, and to interpret whether a second c line comprises PS related address information or CS related address information.

22. The method of claim 21, further comprising manipulating the inspected SIP SDP message by changing content of the first c line.

\* \* \* \* \*